Dec. 21, 1948.   L. W. BURCH   2,456,617
LIQUID LEVEL INDICATOR
Filed July 30, 1943
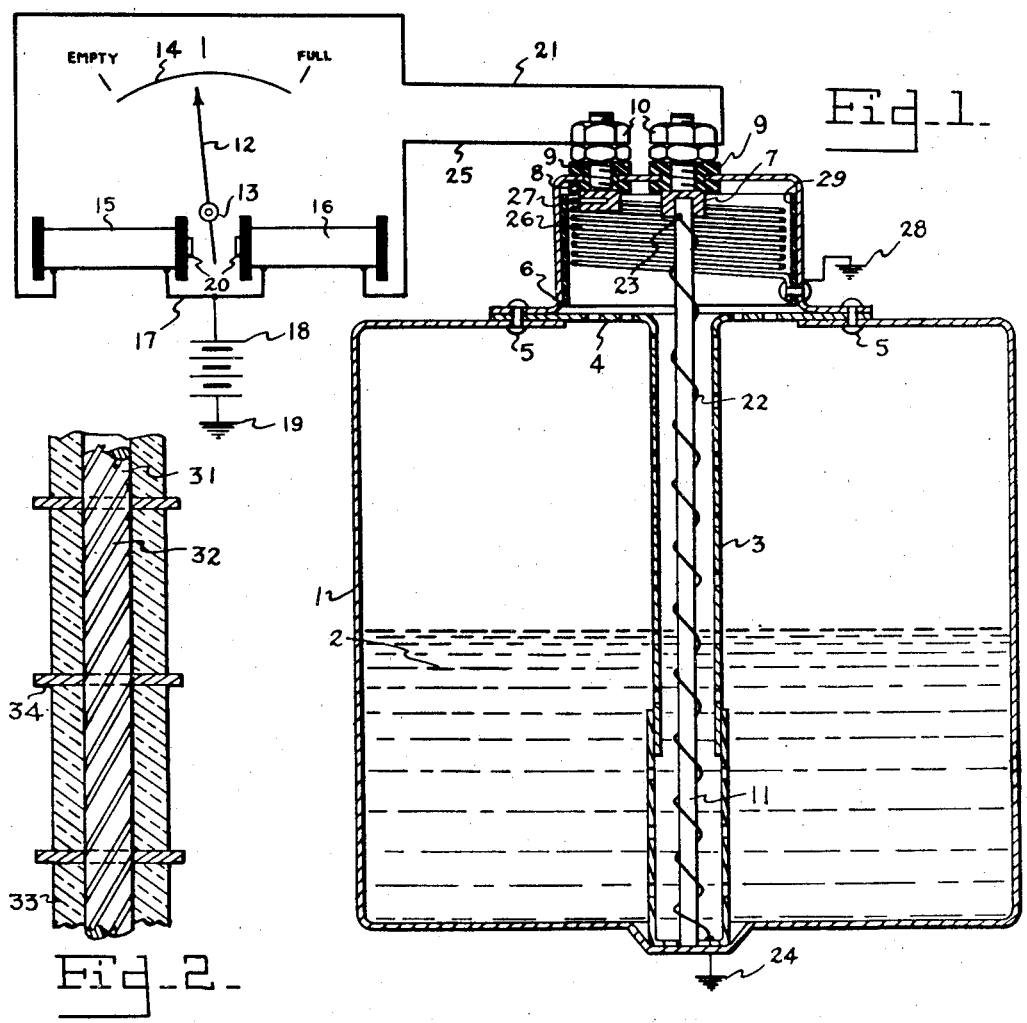
INVENTOR.
Lyndon W. Burch
BY
C. E. Harrison & H. E. Thibodeau
ATTORNEYS.

Patented Dec. 21, 1948

2,456,617

UNITED STATES PATENT OFFICE 2,456,617

LIQUID LEVEL INDICATOR

Lyndon W. Burch, Detroit, Mich.

Application July 30, 1943, Serial No. 496,697

5 Claims. (Cl. 73—304)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel temperature-sensitive indicator operating on the principle that the resistance of a conductor varies with its temperature. In the simplest embodiment the conductor is merely exposed to the air or other medium and functions as a heat detector. In a more developed form the device is used for showing the liquid level in the fuel tank. In this application, use is made of the additional phenonemon that a conductor carrying current and exposed to both liquids and gas dissipates its heat of resistance to these media at different rates.

These principles are embodied in the level indicator by suspending a conductor in the receptacle and passing current therethrough. A solenoid is electrically connected to the conductor and positioned to act upon a movable indicator. Variations of the liquid level will produce variations in the resistance of the circuit, the amount of current passed therethrough and the effect of the solenoid on the indicator. With proper calibration of a dial associated with the indicator, reasonably accurate readings of the liquid level may be obtained.

In the preferred construction, the indicator is influenced by two opposed solenoids on opposite sides thereof, one of which is connected to the coil as previously stated. The other is connected in a manner to exert a substantially uniform effect on the indicator and is preferably coupled with a coil designed to balance the first named conductor and thus maintain the indicator in a neutral position during a given condition of the liquid level.

The invention is disclosed by way of example in the following description and in the accompanying drawing in which:

Figure 1 is a vertical section of a tank equipped with the invention as a level gage, and a wiring diagram of the apparatus.

Figure 2 is a detail section of a modified construction.

With reference to Figure 1, the tank or receptacle 1 contains a body of liquid 2, the level of which is to be indicated. In the tank is mounted a vertical perforated tube 3 preferably flanged at 4 over the top of the tank and secured to said top by rivets 5. Upon the tank and over the tube is mounted a cap 6 for a purpose that will presently be described. The cap may be held by rivets 5.

A pair of inverted binding posts 7 and 8 are mounted in the top of the cap 5 and insulated therefrom by suitable bushings 9 clamped by nuts 10 on the post. From the post 7 is suspended an insulating rod 11 passing centrally through the tube 3 to the bottom of the tank 1.

The indicating instrument, which may be disposed at any suitable distance from the tank 1, includes a magnetic needle or pointer 12 pivotally mounted at 13 and cooperating with a dial 14. At opposite sides of the needle 12, preferably at the shorter lever arm, are disposed solenoids 15 and 16 having their inward ends joined by a conductor 17. The latter is connected to one terminal of a battery 18 or other source of current, the other terminal being grounded at 19. Each solenoid contains a soft iron or equivalent core 20.

The remaining end of the coil 15 is joined by a conductor 21 to the binding post 7. An open coil 22 of conducting wire is wound on the insulating rod 11, with its upper end secured at 23 to the post 7 and its lower end grounded through the tank 1 at 24. The wire may consist of pure iron, nickel or gold. Some alloys also are suitable for the purpose. The perforated tube 3 serves as an anti-splash guard for the coil 22. The remaining end of the coil 16 is connected by a conductor 25 to the binding post 8.

A dry coil 26 is disposed within the cap 6 has one end connected at 27 to the post 8 and its other end grounded through the cap at 28. The coil is separated from the cap by an insulating lining 29.

The electrical system comprises two circuits. One circuit may be traced from ground 19 through the battery 18, coil 16, conductor 25, binding post 8, dry coil 26 and ground 28. The resistance of this circuit is fixed. The second circuit may be traced from ground 19 through battery 18, coil 15, conductor 21, binding post 7, coil 22 and ground 24. The resistance of this circuit varies with the depth of immersion of the coil 22 in the liquid 2.

The latter condition is due to the fact that the electrical resistance of a wire varies with its temperature. The heat of resistance generated in the coil 22 is dissipated at different rates in liquid and in air or vapor, that is, below and above the liquid level. The dissipation in liquid is usually faster. Consequently, the depth of immersion of the coil 22 affects the temperature of the coil and hence the resistance of its circuit and the quantity of current passed through the circuit from the source 18.

The system may be designed to pass equal currents through the coils 15 and 16 when the tank is half full, in which case the solenoid attracts the needle 12 with equal force on both sides and brings it to the mid-point of the scale 14 or in a vertical position. At this condition, the wire 22 is of the same resistance as the coil 26, so that the wire is balanced by the coil. When the tank is full, the temperature and resistance of the coil 22 are decreased, the current in coil 15 increased, and the needle 12 moved to the right on the scale 14.

Figure 2 shows a modified form of liquid-permeable tube surrounding the sensitive wire. An insulating rod 31, corresponding to the rod 11 of Figure 1, is wound with a temperature-sensitive wire 32 as previously described, but preferably embedded in the rod at least flush with the surface thereof. This structure is enclosed in a series of superimposed tubes or sleeves 33 consisting of a porous ceramic material. A non-absorbent washer 34 is preferably inserted between successive tubes. This construction replaces the perforated tube 3 of Figure 1.

The porous material permits the liquid to make contact with the wire 31 for the purpose previously described, with substantially no air at the wire so that the danger of combustion is entirely eliminated. The washers 34 prevent the absorbed fluid from rising by capillary action a substantial distance above the actual liquid level in the tank. The tubes may be molded on the rod, wire and washers if desired.

Although specific embodiments of the invention have been illustrated and described, it will be understood that various alterations in the details of construction may be made without departing from the scope of the invention as indicated by the appended claims.

What I claim is:

1. In a liquid level indicating system wherein means is provided for electrically indicating the extent to which a resistance element is immersed in liquid, a resistance element comprising an insulating rod adapted to be mounted vertically in a receptacle containing liquid, a conductor supported along said rod and having a temperature coefficient of resistance, and a porous ceramic material encircling said rod and conductor.

2. A liquid level indicator comprising, in combination with a receptacle, a cap mounted on said receptacle, an insulating rod extending from said cap vertically into said receptacle, a conductor supported along said rod and having a temperature coefficient of resistance, a coil mounted in said cap, two solenoids connected respectively to said conductor and said coil, a movable indicator mounted to be moved by said solenoids, and means for passing current through said conductor, coil and solenoids and connected to said solenoids in a manner to cause them to act oppositely on said indicator.

3. In a liquid level indicating system wherein means is provided for electrically indicating the extent to which a resistance element is immersed in liquid, a resistance element comprising an exposed temperature-sensitive conductor and porous liquid-permeable material fitted on said conductor.

4. In a liquid level indicating system wherein means is provided for electrically indicating the extent to which a resistance element is immersed in liquid, a resistance element comprising an exposed temperature-sensitive conductor, superimposed tubes of porous liquid-permeable material fitted on said conductor, and non-absorbent washers inserted between adjacent tubes.

5. In a liquid level indicating system having an indicator actuated by opposed solenoids, a liquid receptacle element comprising a cap adapted to be mounted on a receptacle, an insulating rod extending vertically downward from said cap, a conductor supported along said rod and having a temperature coefficient of resistance, a resistance element mounted in said cap, means for electrically connecting the conductor to one of the opposed solenoids, and means for electrically connecting the resistance element to the other of the opposed solenoids.

LYNDON W. BURCH.

REFERENCES CITED

The following references are of record in the file of this patent:

UNITED STATES PATENTS

| Number | Name | Date |
| --- | --- | --- |
| 989,420 | Reichel | Apr. 11, 1911 |
| 989,929 | Schroder et al. | Apr. 18, 1911 |
| 1,459,391 | Clausen | June 19, 1923 |
| 1,681,314 | Vawter | Aug. 21, 1928 |
| 1,841,341 | Tanner | Jan. 12, 1932 |
| 1,957,510 | Vawter | May 8, 1934 |
| 2,181,960 | Bacon | Dec. 5, 1939 |
| 2,342,553 | Olpin | Feb. 22, 1944 |

FOREIGN PATENTS

| Number | Country | Date |
| --- | --- | --- |
| 7,288 | Great Britain | Mar. 27, 1913 |
| 129,741 | Great Britain | July 24, 1919 |
| 366,663 | Great Britain | Feb. 11, 1932 |
| 513,427 | Great Britain | Oct. 12, 1939 |